(12) United States Patent
Borg-Bartolo et al.

(10) Patent No.: US 10,801,317 B2
(45) Date of Patent: Oct. 13, 2020

(54) MARINE RISER COMPONENT AND METHOD OF ASSESSING FATIGUE DAMAGE IN A MARINE RISER COMPONENT

(71) Applicant: OIL STATE INDUSTRIES (UK) LIMITED, Aberdeen (GB)

(72) Inventors: David Borg-Bartolo, Dingli (MT); David Morgan, Aberdeen (GB)

(73) Assignee: Oil States Industries (UK) Ltd., Aberdeen (GB)

( * ) Notice: Subject to any disclaimer, the term of this patent is extended or adjusted under 35 U.S.C. 154(b) by 0 days.

(21) Appl. No.: 15/755,987

(22) PCT Filed: Aug. 26, 2016

(86) PCT No.: PCT/GB2016/052655
§ 371 (c)(1),
(2) Date: Feb. 27, 2018

(87) PCT Pub. No.: WO2017/037432
PCT Pub. Date: Mar. 9, 2017

(65) Prior Publication Data
US 2018/0252090 A1 Sep. 6, 2018

(30) Foreign Application Priority Data
Aug. 28, 2015 (GB) .................................. 1515309.1

(51) Int. Cl.
*E21B 17/01* (2006.01)
*E21B 47/001* (2012.01)
(Continued)

(52) U.S. Cl.
CPC ............ *E21B 47/007* (2020.05); *E21B 17/01* (2013.01); *E21B 47/001* (2020.05);
(Continued)

(58) Field of Classification Search
CPC .. E21B 17/01; E21B 47/0001; E21B 47/0006; E21B 47/001; E21B 47/007; G01M 5/0058
See application file for complete search history.

(56) References Cited

U.S. PATENT DOCUMENTS 3,855,853 A * 12/1974 Claycomb ........... E21B 47/0006
175/40
3,855,857 A * 12/1974 Claycomb ........... E21B 47/0006
73/152.59
(Continued)

FOREIGN PATENT DOCUMENTS

EP 0452573 6/2006

OTHER PUBLICATIONS

McGraw Hill, Mechanical Engineering Design, Seventh Edition, International Edition 2004, Shigley, Joseph Edward "Mechanical Engineering Design," 7th ed. ISBN 007-123270-2, Printed in Singapore.
(Continued)

*Primary Examiner* — Matthew R Buck
(74) *Attorney, Agent, or Firm* — Morgan, Lewis & Bockius LLP

(57) ABSTRACT

A marine riser component which has an integrated fatigue damage sensor in which the sensor is adapted to be damaged by stresses and strains applied to the marine riser component, and is adapted to record said damage on the sensor. The sensor is optionally integrated into the body of the marine riser component in a location on the component that transmits fatigue loads to the sensor at a known stress concentration factor, optionally in a recess on the body, for example, in a closed recess on an outer surface of the marine riser component.

16 Claims, 3 Drawing Sheets

(51) Int. Cl.
*E21B 47/007* (2012.01)
*G01M 5/00* (2006.01)

(52) U.S. Cl.
CPC ........ *G01M 5/0058* (2013.01); *G01M 5/0033* (2013.01); *G01M 5/0083* (2013.01)

(56) References Cited

U.S. PATENT DOCUMENTS

| | | | | |
|---|---|---|---|---|
| 4,174,628 | A * | 11/1979 | van den Bussche | ... B63B 21/50 405/195.1 |
| 4,805,449 | A * | 2/1989 | Das | ........... E21B 21/08 175/48 |
| 5,099,700 | A * | 3/1992 | Morin | ........... E21B 47/0006 33/790 |
| 7,757,759 | B2 * | 7/2010 | Jahn | ........... E21B 19/166 166/250.01 |
| 8,074,720 | B2 * | 12/2011 | Radi | ........... E21B 19/004 166/250.01 |
| 8,800,665 | B2 * | 8/2014 | Phadke | ........... E21B 17/01 166/250.01 |
| 9,004,174 | B2 * | 4/2015 | Mebarkia | ........... E21B 41/0085 166/247 |
| 9,932,815 | B2 * | 4/2018 | Flight | ........... E21B 17/01 |
| 2005/0100414 | A1 | 5/2005 | Salama | |
| 2006/0115335 | A1 | 6/2006 | Allen | |
| 2012/0031620 | A1 | 2/2012 | Phadke | |
| 2012/0132467 | A1 | 5/2012 | Zeineddine | |
| 2012/0303293 | A1 | 11/2012 | McNeill et al. | |
| 2013/0213129 | A1 * | 8/2013 | Kumar | ........... E21B 47/007 73/152.47 |
| 2015/0176237 | A1 | 6/2015 | Li | |

OTHER PUBLICATIONS

American Petroleum Institute, Energy API, "Planning, Designing, and Constructing Tension Leg Platforms," API Recommended Practice 2T, Third Edition, Jul. 2010.
PCT, International Search Report and Written Opinion, PCT/GB2016/052655, dated Nov. 9, 2016.
UK/IPO—Search Report under Section 17(5), Application No. GB1515309.1, dated Sep. 8, 2015.
IPRP—International Preliminary Report on Patentability, PCT/GB2016/052655, dated Mar. 6, 2018.
The British Standards Institution 2015, BS 7608:2014+A1:2015, pp. 53-68, Starting with Chapter 16 "Allowable fatigue stresses", through 16.7 "Joints Subjected to a stress spectrum"—being submitted in Original Hard Copy—Mailed to USPTO.

* cited by examiner

MARINE RISER COMPONENT AND METHOD OF ASSESSING FATIGUE DAMAGE IN A MARINE RISER COMPONENT

The present invention relates to a marine riser component, and to a method of assessing fatigue damage in a marine riser component, for example in a connector component of a riser for use in connecting components of a marine riser system used in the drilling, completion, work-over and/or production of fluids from an oil or gas well.

BACKGROUND TO THE INVENTION

Marine riser systems used in offshore oil or gas wells typically incorporate large diameter pipes to provide a conduit extending through the water column between a platform or a vessel located on the surface and the borehole into the substrate leading to the reservoir of the well. The riser conduit facilitates access to the well allowing passage of tools into the well during e.g. drilling phases, and allows the recovery of production fluids from the well through production tubing, which passes through the riser during later production phases of the well. Normally, the riser will incorporate connector components to link the individual riser joints and to provide a connection at the surface and at the seabed.

In most cases, the marine riser will be subject to cyclic loads, for example caused by wave and tidal actions. Repeated cyclic loads on subsea risers leads to metal fatigue in the riser system. The structural integrity of a riser can be compromised as repeated cyclic loading will eventually cause fatigue cracks to initiate e.g. from the surface of the riser, and depending on the nature of the loads and duration of service, such fatigue induced cracks could eventually propagate and fracture the riser leading to catastrophic failure of the riser string, with the possibility of hydrocarbon release into the marine environment surrounding the well, and potential injury or loss of life.

Fatigue damage is mitigated during the design stage of a product, to try to ensure that the stresses and strains in the component do not produce fatigue initiated cracks.

US2012/0303293, US2012/0031620 and US2015/0176237 are useful for understanding the invention.

SUMMARY OF THE INVENTION

According to the present invention there is provided a marine riser component having an integrated fatigue damage sensor.

Optionally the sensor is adapted to be damaged by stresses and strains applied to the marine riser component. Optionally the sensor is adapted to record said damage on the sensor.

Optionally the sensor is integrated into the component in a location on the component that transmits fatigue loads to the sensor at a known stress concentration factor.

Optionally, the fatigue damage sensor is integrated into a body of the marine riser component.

The marine riser component can form part of a marine riser in use. Optionally the marine riser component can comprise a coupling or a part of a coupling in a marine riser. Optionally the component can comprise a connector component, for example, a pin or a box connector component, or a pipe of the marine riser. Optionally the component can be a component connected to the marine riser pipe such as a clamp or an auxiliary line.

Optionally, the fatigue damage sensor is mounted in a recess on the body. Optionally the recess is formed on a surface of the body, e.g. on an outer surface of the body of the component. Optionally the recess is formed on an outer diameter of the marine riser.

One embodiment of the invention also provides a method of assessing fatigue damage in a marine riser component, the method comprising integrating a fatigue damage sensor into the marine riser component, damaging the sensor by stresses and strains applied to the marine riser component and recording said damage on the sensor, and collecting fatigue damage data from the damaged fatigue damage sensor.

Optionally the fatigue damage sensor is mounted in a recess on an outer surface of the marine riser component.

One embodiment of the invention also provides a method of assessing fatigue damage in a marine riser, using the above method. One embodiment of the invention also provides a marine riser incorporating a marine riser component as defined above.

Optionally the marine riser component is a connector component, adapted for connection to a marine riser, optionally for connection of different components of the marine riser, or for connecting the marine riser to a subsea or a surface installation, for example a wellhead or a production platform. The marine riser component can be adapted for connection into a marine riser in different ways, for example, by a screw thread, by welding, or with a bayonet or latched attachment etc.

The component optionally incorporates a bore for fluid communication between the component and a bore of the marine riser to which the component is adapted to connect. Optionally the bore of the component and the bore of the marine riser are coaxial when the component is connected to the marine riser. Optionally, the component has first and optionally second ends, which are adapted for connection (e.g. by cooperating threads or by other connection mechanisms) to sections of a marine riser system. The component may be formed integrally with a section of the marine riser pipe, or may be secured thereto e.g. by welding. The component is optionally mounted on an end of a section of marine riser, for example, forming at least a part of a box and pin coupling at an end terminal of the section of marine riser. Optionally, the recess is closed. Optionally, the recess is sealed against fluid ingress. Optionally, the recess is covered e.g. by a plate such as a cover plate, which can optionally be sealed against the component to restrict fluid ingress into the recess. Optionally, the plate is removable, e.g. removable from the component to expose the recess. Optionally, the plate is secured in place over the recess by removable fasteners connecting the plate to the outer surface of the component. Optionally, the recess incorporates a groove adapted to retain a seal, which is typically compressed between at least a portion of the plate and the marine riser component. Optionally, the seal surrounds the recess. Optionally, the seal comprises an elastomeric seal, such as an O-ring. Optionally, the plate is held in position over the recess by at least one fastener extending through the plate and engaging the component. Optionally, the fastener can comprise a bolt, or a similarly threaded fastener with a shaft having an external thread, which can engage a threaded socket optionally formed in the outer surface of the component. Optionally, a number of fasteners can be located around the periphery of the plate to engage the component and retain the plate in place over the recess at a number of peripherally-spaced locations around the plate. Optionally, the fasteners engage portions of the component outside the groove, so that the seal is disposed between the fasteners and the recess, and so that the seal thereby resists transfer of fluid from the surrounding environment into the recess when the plate is applied and the fasteners are engaging the component. The fasteners and their apertures can therefore be sealed or unsealed as desired in different examples of the invention.

Optionally, the recess extends radially into the outer surface of the component, perpendicular to the axis of the component. Optionally, the recess extends axially along the component, optionally parallel to the bore of the component. Optionally, the recess extends circumferentially around the component. Optionally, the outer surface of the component in which the recess is formed can be arcuate or flat. Optionally, the plate follows the contours of the recess, and engages a sealing face of the recess. The seal groove is optionally formed on the sealing face, which is optionally formed on a shoulder surrounding the inner surface of the recess and facing radially outwardly from the recess. Optionally, the outer surface of the plate or cover is flush with the outer surface of the component outside the recess.

Optionally fluid in the recess can be evacuated before sealing the recess, for example, by applying a vacuum to the recess to remove gas. Alternatively, in some examples, the recess can be deployed containing gas e.g. air at atmospheric pressure Optionally the plate or cover can have a communication port extending through the plate from the outer surface of the component into the recess, and optionally incorporating a plug or socket allowing connection of power and/or signals conduits outside the outer surface of the component to the inner surface of the recess.

Optionally the recess is formed on an area of the component having an expanded outer diameter, with a larger cross-section wall thickness (at least in the area of the recess) than an adjacent area of the component and/or a larger cross-section than the cross section of the marine riser to which it is connected or secured. By cross-section wall thickness we typically mean the thickness of the side wall between the outer surface of the component and the inner bore at that axial location. Optionally, the recess is formed near to an end terminal of the component, for example, at a pin or male connector portion. Optionally, the recess is formed in a recut length of the pin or box end of the connector, adapted for re-cutting of threads on the outer surface of the connector. In some examples, the recess can be formed in an upset part of the pipe.

Optionally, the area of the component having the expanded outer diameter and bearing the recess on the outer surface thereof transitions from an adjacent section of the component having a reduced outer diameter as compared with the area of the component having the expanded outer diameter and bearing the recess. Optionally, the expanded outer diameter area and the reduced outer diameter area are connected by a chamfered section of the component. The difference between the outer diameter of the expanded area and the outer diameter of the adjacent reduced diameter area is optionally at least as deep as the recess.

Optionally, the fatigue damage sensor comprises a gauge having an initiated crack and being adapted to monitor the growth of the crack as the gauge is subjected to stress. A suitable fatigue damage sensor is described in EP0452573A (which is incorporated herein by reference) and is marketed by Strainsall UK Limited under the trade mark CrackFirst. In other examples of the invention, different fatigue damage sensors can be used.

Optionally the sensor is damaged by the stresses and strains applied to the marine risers, and the damage is recorded on the sensor. Optionally the sensor is damaged as the crack propagates due to the fatigue loads applied to the sensor through the component. Optionally the damage accumulates on the sensor in incremental and irreversible steps. Optionally the damage is irreversible damage and is irreversibly recorded, by permanent damage to the sensor so that the sensor remains damaged by the stress or strain and does not recover when the stress or strain acting on the sensor is removed.

The sensor optionally accumulates fatigue damage at a point of cyclic stress, optionally by physically growing a crack, optionally in incremental damage steps as the component progresses through its operational life. Advantageously, the progress of the crack and the corresponding fatigue damage to the riser can be assessed visually by inspection of the sensor, and in some examples, the sensor does not necessarily require any power source for the fatigue data to be recorded. Alternatively, the progress of the crack can be assessed by other means, for example electronic resistance measurements across the crack, and changes in the resistance measurements over time can be recorded and preserved on the sensor and compared to establish trends in crack growth. Optionally, the growth of the crack can be charted against time and the data can be stored by the sensor or by a storage device, so that changes in the growth of the crack can be mapped to particular times or time ranges within the life of the component.

In order for the marine riser component and the sensor to be optimally integrated, the stresses at the sensor location are typically tuned to the envisaged fatigue life of the component. The sensor location on the component affects the Stress Concentration Factor (SCF) which is a ratio relating to the stress that the sensor experiences in relation to tensile and bending moment loads experienced by the marine riser component which vary across the component. In order for the sensor to function optimally, there is advantageously sufficient stress for the sensor to measure, without itself being prematurely damaged. Accordingly the sensor is placed on the component in a suitable location with a suitable SCF that is appropriate for the rating of the sensor, so that the sensor experiences the correct amount of stress during operation of the component in normal use, which is high enough to cause sufficient damage to the sensor over a suitable working period and to permit the calculation of the stress applied to the rest of the component factoring in the SCF, but not high enough to prematurely damage the sensor, for example, to cause a high level of damage to the sensor within a short period immediately following deployment.

In order to identify a suitable position for the sensor attachment with the appropriate SCF, a finite element analysis (FEA) of the marine riser component is optionally carried out. The FEA process, and the determination of the SCF, is well-known in the art and detailed descriptions can be found in most university-level mechanical engineering textbooks, for example, Mechanical Engineering Design by Shigley et al ISBN 007-123270-2 contains useful information in this regard and is incorporated herein by reference. Commonly, specialised software is used to perform the different steps in the analysis, for example the ANSYS Simulation suite of programs.

By way of a brief summary of FEA and how it is used to determine the location of the integration point of the sensor, a model of the component is produced, for example in a CAD package, and this is divided into a mesh of "elements" that are connected by "nodes". The elements can comprise any curvilinear shape, for example a triangle or square. This division of the model permits localised analysis of the elements, simplifying the analysis of the underlying partial differential or integral equations that describe the problem being analysed—in this case, the stresses and strains that the marine riser component experiences under load, and the response of said component to the load. Once the element analysis has been completed, the results can then be combined to produce a contour map of the model, highlighting nodal displacements and stress levels across the model. Optionally the contour map can be constrained to one portion of the model.

Through iterative FEA runs, a suitable position for the sensor can be identified. FEA determines the parameter $\sigma_{max}$, the maximum or peak stress experienced at the sensor location. The SCF (which for this purpose will have a value less than 1) is determined by the equation $$SCF=\sigma_{max}/\sigma_0<1$$

The nominal stress ($\sigma_0$) used to calculate the SCF required at the sensor location is the membrane stress in the riser pipe produced by applying an equivalent tensile load to the riser pipe. Equivalent tension is the sum of both the pure tensile loads experienced by the riser and the bending stresses caused by any bending moment loads as calculated by the flexure formula M/I=sigma/y, as described for example, in Equation 4-26 of 'Mechanical Engineering Design by Shigley et al. ISBN 007-123270-2, the disclosure of which is incorporated herein by reference. The equivalent tension approach is widely used in industry and described in detail in API RP 2T section 9.6.4.2.1, the disclosure of which is incorporated herein by reference.

The riser pipe and associated components such as connectors etc., are designed and constructed to a relatively high fatigue performance, with a rating of class C or above on a typical Stress/No of cycles (or S/N curve) normally used in the art to define the stress capacity of different objects. Standard S/N curves which can be used for this purpose are well known from published sources such as British Standard 7608, "Guide to fatigue design and assessment of steel products," which is incorporated herein by reference. Accordingly, at a given stress range (the range over which applied stress varies in the course of a cycle) a class C component will withstand many more cycles before failure than a corresponding lower class D, E, F or F2 component. In the present examples, the sensor is optionally designed to a lower capacity for example, with a class F2 rating, and is therefore designed to fail at a lower number of cycles at the same stress range, when subjected to the same stress range.

The appropriate SCF according to the above equation is determined from a standard S/N curve (optionally derived from BS7608) giving the relationships between the number of cycles before failure at a given stress range for different classes of fatigue S/N curves. Once the SCF is known from the standard S/N curve, FEA can be used to determine the best sensor location on the component with the most appropriate SCF closest to the target SCF according to the calculation above, based on the desired SCF and the known S/N curves from BS7608. In the present examples, the SCF is normally less than 1.

The sensor is thus optionally positioned in a location on the component that in normal use experiences stress reflective of the stress and strain that is experienced by the riser pipe in use. The sensor is optionally positioned in a location on the component that is strong enough to resist formation of the recess on the outer surface, but which accurately reflects the stresses applied to the marine riser pipe. The stress applied in use to the sensor through the floor of the recess is therefore typically an accurate reflection of the actual stresses applied to the riser pipe.

Optionally the sensor is exposed to less stress than the other parts of the riser. The location of the sensor integrated in the component is chosen for each component using FEA techniques based on the most appropriate SCF for each case.

The sensor is optionally passive, optionally requiring no wires or cables to run down the riser string, and requiring no local power supply or data export pathway. Optionally, data can be determined by periodic visual inspections. The final crack dimensions on the sensor can optionally indicate the fatigue state of the component and/or the riser. Furthermore, variable amplitude fatigue damage can be captured by the sensor, without the need for expert post-processing algorithms and subjective interpretation of the data from otherwise active, strain gauge based systems.

In some examples, the riser incorporating the sensor can be less bulky, and can be less time consuming to deploy. Examples of the invention can optionally be deployed as easily as a conventional riser without fatigue damage sensors, as the sensors are integrated into the riser and optionally do not extend beyond the standard riser envelope.

Optionally, the fatigue damage sensor is connected to an inner surface of the recess. Optionally, the recess has a floor extending parallel to the nominal outer diameter of the component and/or the marine riser, and optionally parallel to the axis of the component and/or the marine riser, and the fatigue damage sensor is optionally connected to the floor of the recess. In some examples, the fatigue damage sensor can be bolted, welded, and/or glued or otherwise fixed in place to the floor of the recess. Optionally, the fatigue damage sensor is attached to the floor of the recess at spaced apart locations on the fatigue damage sensor, optionally at locations on the fatigue damage sensor that are spaced apart on opposite sides of the crack in the sensor, and in practice the locations of the fixings securing the sensor to the floor of the recess can be spaced apart in an axial direction on the sensor. For example, in one example, the fatigue damage sensor can be attached to the floor of the recess by bolts connecting opposite axial ends (optionally each corner) of the fatigue damage sensor to the floor of the recess. In that example, the fatigue damage sensor optionally has a long axis, which is optionally arranged parallel to the axis of the component, for example parallel to the axis of the bore extending through the connector. The crack on the sensor is optionally oriented perpendicular to the axis, to detect axial strain with maximum sensitivity. Optionally, the crack on the sensor can be oriented in other directions, to be more sensitive to other types of strain. The crack on the sensor is optionally linear, optionally geometrically linear, and is optionally oriented perpendicular to the measured strain.

Optionally, the floor of the recess is spaced radially from the axis of the bore of the component. Optionally, the radial spacing of the floor of the recess from the axis of the bore of the component is less than the radial spacing of the outer surface of the component in the area of the recess, and hence the floor of the recess extends radially inwardly towards the axis of the bore of the component from the outer surface of the component in the area immediately adjacent to the recess. Optionally, the sidewalls of the recess extend radially, but in some examples, the sidewalls of the recess do not need to precisely follow the radius, and can be, for example, canted at an angle with respect to the radius. Optionally, the floor of the recess is parallel to the axis of the bore of the component, and parallel to the outer diameter of the component. Optionally, the floor of the recess is parallel to the outer diameter of the component in the area of the recess, and optionally parallel to the nominal outer diameter of the component in other areas of the recess spaced apart from the recess. Optionally, the radial spacing between the floor of the recess and the axis of the bore is within 10% e.g. within 5% of the value of the radial spacing between the axis of the bore and the nominal outer diameter of the component, for example the outer diameter of the component in areas spaced away from the recess, outside the area of the component having an expanded outer diameter, although the precise location of the sensor is optionally tailored for each component in order to locate the sensor at a part of the component that has an appropriate SCF, optionally as deduced by FEA for the chosen combination of the riser and the sensor. Therefore, the fatigue damage sensor can optionally be mounted at the same radial spacing as the nominal outer diameter of the component, but in other examples, the floor of the recess can be set at a radial spacing between the nominal diameter of the component and the larger diameter of the load shoulder or other area where the recess is sited; in practice, the site is chosen based on the most appropriate SCF, optionally as determined by FEA.

Optionally, the fatigue damage sensor is subjected to a preload before being fixed to the floor of the recess, so that when fixed in position, the preload is maintained, and continues to act on the fatigue damage sensor. For example, in one aspect, the fatigue damage sensor can be axially stretched, or circumferentially stretched before fixing the fatigue damage sensor to the inner surface of the recess.

Optionally, the fatigue damage sensor is connected via signal conduits to the port on the plate, so that accessing the outer surface of the port, exposed to the outer surface of the plate allows interrogation of the fatigue damage sensor within the recess, without opening the recess or removing the plate. Optionally, the port can be sealed to prevent fluid ingress through the port. Optionally the port can incorporate a cap, which can be sealed to the plate.

Optionally, the component can incorporate a storage device which can read and optionally store data from the sensor. Optionally, the component can incorporate a processor, which can optionally process data from the sensor. Optionally, the fatigue damage sensor can incorporate a power supply such as a battery to allow for data logging. Optionally, the storage device, the processor and the power supply can be incorporated within the recess along with the fatigue damage sensor.

Optionally, the data can be read from the fatigue damage sensor at periodic intervals, for example weeks, months, or years. In one example, data is read from the fatigue damage sensor at six-month intervals, by visual inspection and measurement of the length of the crack, and optionally by electrical resistance measurements across the crack which are compared with earlier measurements to determine changes in crack growth between periodic inspections.

Optionally, the fatigue damage sensor and/or the storage or processing device in the recess is connected via signal and optionally power conduits to a port on the plate, so that accessing the outer surface of the port exposed to the outer surface of the plate can allow interrogation of the fatigue damage sensor within the recess, without opening the recess or removing the plate. Optionally a plug, e.g. a cap is removably sealed to the port on the plate to protect the port during use of the component.

Optionally, each component can have a number of different sensors, which can be located in respective recesses at different axial positions along the component. In one example, each component can have a number of different sensors located in respective separate recesses at the same axial position on the component, but spaced apart from one another circumferentially around the outer surface of the body of the component. In one example, opposite ends of the component can each have at least one sensor, or at least one array of sensors. In each array of sensors, disposed in respective recesses at or near to the same axial position on the component, the sensors and recesses are optionally spaced circumferentially from one another around the outer surface of the body of the component. Optionally, the recesses can be spaced at regular intervals, for example, in one example, three recesses are provided spaced apart at 120° intervals around the outer surface of the pin end of the component. The three recesses incorporate non-recessed areas of the component spaced circumferentially between the recesses. Each recess can optionally incorporate more than one sensor.

The various aspects of the present invention can be practiced alone or in combination with one or more of the other aspects, as will be appreciated by those skilled in the relevant arts. The various aspects of the invention can optionally be provided in combination with one or more of the optional features of the other aspects of the invention. Also, optional features described in relation to one aspect can typically be combined alone or together with other features in different aspects of the invention. Any subject matter described in this specification can be combined with any other subject matter in the specification to form a novel combination.

Various aspects of the invention will now be described in detail with reference to the accompanying figures. Still other aspects, features, and advantages of the present invention are readily apparent from the entire description thereof, including the figures, which illustrates a number of exemplary aspects and implementations. The invention is also capable of other and different examples and aspects, and its several details can be modified in various respects, all without departing from the spirit and scope of the present invention. Accordingly, the drawings and descriptions are to be regarded as illustrative in nature, and not as restrictive. Furthermore, the terminology and phraseology used herein is solely used for descriptive purposes and should not be construed as limiting in scope. Language such as "including", "comprising", "having", "containing" or "involving" and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes. Thus, throughout the specification and claims unless the context requires otherwise, the word "comprise" or variations thereof such as "comprises" or "comprising" will be understood to imply the inclusion of a stated integer or group of integers but not the exclusion of any other integer or group of integers.

Any discussion of documents, acts, materials, devices, articles and the like is included in the specification solely for the purpose of providing a context for the present invention. It is not suggested or represented that any or all of these matters formed part of the prior art base or were common general knowledge in the field relevant to the present invention.

In this disclosure, whenever a composition, an element or a group of elements is preceded with the transitional phrase "comprising", it is understood that we also contemplate the same composition, element or group of elements with transitional phrases "consisting essentially of", "consisting", "selected from the group of consisting of", "including" or "is" preceding the recitation of the composition, element or group of elements and vice versa. In this disclosure, the words "typically" or "optionally" are to be understood as being intended to indicate optional or non-essential features of the invention which are present in certain examples but which can be omitted in others without departing from the scope of the invention.

All numerical values in this disclosure are understood as being modified by "about". All singular forms of elements, or any other components described herein are understood to include plural forms thereof and vice versa. References to directional and positional descriptions such as upper and lower and directions e.g. "up", "down" etc. are to be interpreted by a skilled reader in the context of the examples described to refer to the orientation of features shown in the drawings, and are not to be interpreted as limiting the invention to the literal interpretation of the term, but instead should be as understood by the skilled addressee.

DETAILED DESCRIPTION

Figure 1:
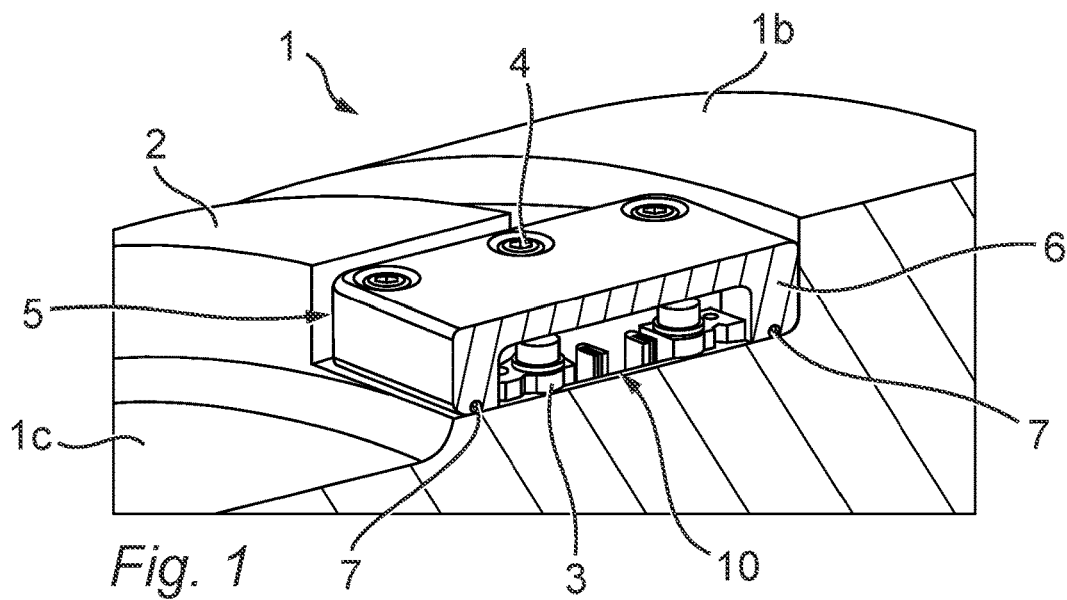
FIG. 1 shows a perspective cutaway view of a first example of a marine riser component in the form of a connector according to one embodiment of the invention.

Referring now to FIG. 1, a marine riser component in the form of a marine riser connector 1 has a pin end with an end terminal male connector portion adapted for connection with an end terminal female connector portion on an adjacent marine riser joint. Optionally, the marine riser connector 1 is located at the top or at the bottom of the marine riser string, at the interface with the surface vessel platform, or the wellhead (not shown), or at any other joint along the string. The pin end and associated male end terminal of the connector 1 is shown to the right hand side of FIG. 1, and the riser pipe is shown on the left hand side of the drawing. The connector 1 incorporates a bore for fluid communication between the connector and a co-axial bore of the marine riser to which the connector is adapted to connect. The connector 1 also has a female (box) end (not shown but at the opposite end to the pin end shown in FIG. 1) adapted for connection (e.g. by cooperating threads or by other connection mechanisms such as welding etc.) to adjacent sections of a marine riser pipe. The connector 1 (and the marine riser sections between the connectors on the end terminals of the marine riser sections) is generally tubular between the pin and box ends and has a nominal outer diameter of (in this example) 24 inches in the central section 1c between the pin and box ends. The connector 1 has at least one end terminal load shoulder 2 having an expanded diameter greater than the nominal pipe outer diameter between the ends of the connector. Different diameters can of course be adopted for any section of the connector and/or the marine riser in other examples, and the dimensions herein are not intended to be limiting.

The pin end of the connector 1 is machined on its load shoulder 2 to form a recess 5 on the outer surface of the connector 1. The load shoulder 2 has an increased radial depth of material as compared with the central section 1c, as the inner diameter is generally similar, but in this case the outer diameter is generally larger by about 5-15% e.g. around 7-10%. In practice, the ratio can vary across different examples of components, depending on the SCF required. The recess 5 can comprise any cavity within the connector suitable to contain the sensor.

The recess 5 houses a box-shaped cover plate 6 that is sealed to the recess floor by a resilient seal in the form of an o-ring 7, to form a watertight air-filled compartment inside the cover plate 6 thereby isolating the sensor from damage by environmental factors unrelated to stress, and to protect the contents of the cover from mechanical damage such as accidental impact when the riser is being run. The cover plate 6 is secured to the floor of the recess 5 by bolts 4, distributed around the periphery of the cover plate 6, optionally at regular intervals, which engage within threaded sockets in the floor of the recess 5. Tensioning the bolts 4 holds the cover plate 6 in place, and compresses the O-ring 7, to seal the interior of the cover plate 6 against the floor of the recess 5, and resisting the ingress of fluids into the sealed area between the cover plate 6 and the floor of the recess 5.

The recess 5 extends radially into the outer surface of the connector, perpendicular to the longitudinal axis of the connector, and axially along the connector, parallel to the bore. The recess 5 also extends circumferentially around the outer surface of the pin end. The cover plate 6 follows the contours of the recess 5, and engages a sealing face surrounding the recess 6. The outer surface of the cover 6 is flush with the outer surface of the pin end of the connector outside the recess 5.

The interior of the cover plate 6 is adapted to contain within the recess a fatigue damage sensor which in this example is in the form of a CrackFirst™ fatigue sensor 10 marketed by Strainsall UK Limited, and is described in EP0452573A (incorporated herein by reference). The fatigue damage sensor 10 comprises a gauge having an initiated crack and the sensor 10 is adapted to monitor the growth of the crack as the gauge is subjected to stress. The sensor 10 optionally registers cumulative fatigue damage at a point of significant cyclic stress, by physically growing the crack as the component progresses through its operational life. Advantageously, the progress of the crack and the corresponding fatigue damage to the riser can be assessed visually by inspection, and the passive sensor 10 in this example does not require any power source for the fatigue data to be recorded. The progress of the crack can be assessed visually or by other means, for example electronic resistance measurements across the crack, and changes in the resistance measurements over time can be recorded and compared to establish trends in crack growth. Optionally the growth of the crack can be charted against time. The crack is arranged substantially perpendicular to the axis of the connector.

The sensor 10 fastened securely to a surface of the connector 1 on the interior of the recess 5. The surface to which the sensor 10 is fixed optionally extends axially along the recess, parallel to the axis of the connector, so that strain in the connector 1 is transmitted through the surface, and hence to any sensor 10 that is fixed to the surface. The location of the recess 5 on the load shoulder 2 with its deeper wall section means that the load shoulder 2 is still strong enough to resist deformation of the load shoulder even with the material removed to form the recess on the outer surface. However, the surface of the recess 5 to which the sensor 10 is fixed is also sufficiently compliant to reflect accurately the stresses applied to the other parts of the connector.

Figure 7:
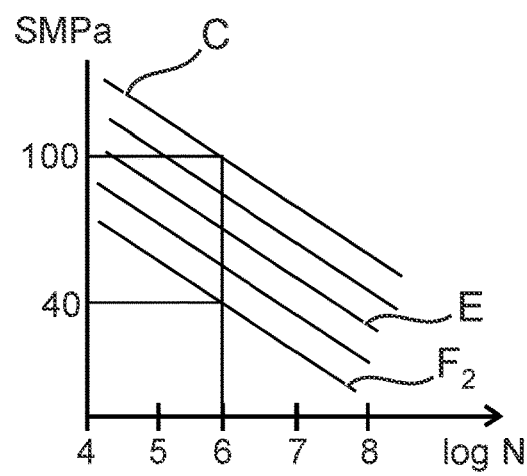
FIG. 7 shows a typical schematic S/N curve used in the determination of a suitable location for the sensor on the above examples.

The location and construction of the sensor 10 is typically such that stress and strain applied to the connector 1 will damage the sensor 10 before it damages the connector 1. Premature damage to the sensor could improperly suggest that the riser is experiencing greater fatigue damage than is actually the case, resulting in unnecessary intervention such as Non-Destructive Testing (NDT). The depth of the recess and the position of the surface on which the sensor 10 is fixed is chosen so that the stress applied to the sensor is a fraction of the stress applied to the riser pipe. In this example, the riser pipe and associated components such as connectors 1 etc., are designed and constructed to a relatively high fatigue capacity, with a rating of class C or above on a typical mean stress range/No of cycles (or S/N curve) normally used in the art to define the stress capacity of different objects, well known from sources such as BS7608, which is incorporated herein by reference. A typical S/N curve used in the determination of the location of the sensor in the connector 1 is shown in FIG. 7. The stress range to be experienced by the components in the riser in normal use will be known at the design stage, and the frequency of cycles. In this example, for the sake of simplicity of explanation, the stress range is 100 MPa, at which stress, the predicted number of cycles to failure of the class C riser will be approximately $10^6$ as shown in the logarithmic scale of FIG. 7, corresponding to a product lifetime of 20 years. The corresponding maximum stress range for the weaker class F2 sensor to fail in the same number of $10^6$ cycles is determined from the S/N curve in FIG. 7 as 40 MPa. Hence, the SCF for this particular combination of riser and sensor operating at the stress range of 100 MPa in the riser for a desired lifetime of $10^6$ cycles is 40/100=0.4.

In this example of the invention, an optimal position for the sensor is optionally calculated by creating a finite element model of the marine riser connector and generating a mesh of elements and nodes from this, using a software package adapted for this analysis. The response of the connector under loading is modelled and analysed. A contour map showing the distribution of stress is produced by the FEA software, along with a calculation of the peak stress and the location(s) at which this is experienced by the connector, and a graph of the stress gradient curve. The nominal stress used to calculate the SCF required at the sensor location is the membrane stress in the riser pipe produced by applying an equivalent tensile load to the riser pipe. Equivalent tension is the sum of both the pure tensile loads experienced by the riser and the bending stresses caused by any bending moment loads as calculated by the flexure formula $M/I=\text{sigma}/y$ as stated in Equation 4-26 of 'Mechanical Engineering Design by Shigley et al. ISBN 007-123270-2. The equivalent tension approach is widely used in industry and described in detail in API RP 2T section 9.6.4.2.1. Both references are incorporated herein by reference.

The stress concentration factor that the sensor experiences at different locations is calculated by dividing the peak stress value at the sensor location by the nominal stress value of the component, which in this example is the riser pipe membrane stress. Using this information, the correct recess geometry can be identified and the recess modified appropriately to produce the required SCF within the recess. The location of the sensor attachment is advantageously such that the sensor experiences sufficient stress to reflect the fatigue life of the connector, without the sensor being subjected to so much loading that it is prematurely damaged, therefore the position and geometry of the recess is chosen so that the appropriate SCF occurs at the sensor location. In the present example, the FEA is used to identify the correct depth of recess at the particular location to provide a desired SCF of 0.4, and the recess is then milled (or otherwise formed) with the calculated geometry according to the FEA results. Accordingly, the stress applied to the rest of the component is reflected in accordance with the SCF in the stress measured by the sensor 10.

The sensor 10 is passive in this example, requiring no wires or cables to run down the riser string, and requiring no local power supply or data export pathway. Optionally, data can be determined by periodic visual inspections of the crack when the riser is retrieved to the surface and in this example, post-sampling processing is not required. The final crack dimensions on the sensor 10 can optionally indicate the fatigue state of the riser. Furthermore, variable amplitude fatigue damage can be captured by the sensor, without the need for expert post-processing algorithms and subjective interpretation of the data from otherwise active, strain gauge based systems.

The fatigue damage sensor 10 is connected to the floor of the recess extending parallel to the nominal outer diameter of the connector 1 by bolts 3 set at axially spaced locations on the fatigue damage sensor 10. In this example, the fatigue damage sensor 10 is attached to the floor of the recess 5 by fixings such as bolts 3 set on opposite sides of the crack in the fatigue damage sensor 10, optionally through opposite axial ends of the fatigue damage sensor 10, which are spaced apart axially along the longitudinal axis of the sensor 10, arranged parallel to the longitudinal axis of the bore of the connector 1. Optionally adhesives such as epoxy can be used in addition to or instead of the bolts 3 to attach the sensor 10 to the floor of the recess.

The radial spacing of the floor of the recess 5 from the longitudinal axis of the bore of the connector is less than the radial spacing of the outer surface of the pin end immediately outside the recess. The floor of the recess 5 extends radially inwardly towards the axis of the bore of the connector from the outer surface of the connector in the area immediately adjacent to the recess 5. The sidewalls of the recess extend radially in this example. In this example, the radial spacing between the floor of the recess and the axis of the bore is only slightly larger (within 5%) than the radial spacing between the longitudinal axis of the bore and the nominal outer diameter of the connector 1, for example the nominal outer diameter of the central section 1*c* of the connector 1 spaced away from the recess 5.

The fatigue damage sensor 10 in this example is subjected to a preload before being fixed to the floor of the recess 5, so that when fixed in position by the bolts 3, the preload is maintained, and continues to act on the fatigue damage sensor 10. In this example, the fatigue damage sensor 10 is axially and/or circumferentially stretched before fixing the fatigue damage sensor to the inner surface of the recess 5 via the bolts 3.

Once the riser is retrieved for inspection, the cover 6 is removed and the fatigue damage is read out from the sensor 10 either visually, manually, or using a multi-meter to check for continuity across the sensor's crack tracks. This reading relates directly to a percentage of the fatigue life consumed by the riser and/or the connector in its previous deployment.

Figure 2:
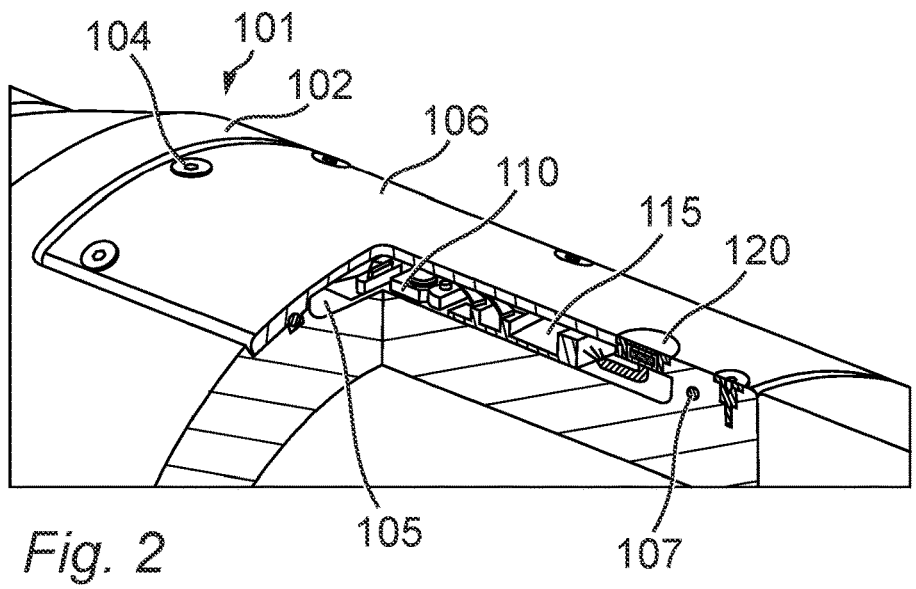
FIG. 2 shows a perspective part cutaway view of a second example of a marine riser component in the form of a thread recut length on a completion riser pipe according to one embodiment of the invention.

Referring now to FIGS. 2-6, a second example of a marine riser component in the form of a completion riser 101 is shown which has many features in common with the first example shown in FIG. 1. Similar features in the connector 101 will be given the same reference number increased by 100, and will not be described in detail, for which the reader is referred to the earlier example. The connector 101 has a pin end with male and female connector portions. The pin end of the connector 101 is shown in FIG. 2. The connector 101 incorporates a bore having a longitudinal axis X-X and is generally tubular between the pin and box ends.

The pin end of the connector 101 has an end terminal recut length 102 having an expanded diameter greater than the nominal diameter between the ends of the riser pipe, adapted for re-cutting of threads on the outer surface of the connector. The inner diameter of the bore is consistent, so the recut length 102 has a thicker wall than the central section 101c. The recut length 102 has a recess 105 on the outer surface covered by a plate 106 sealed by an o-ring 107 held in a groove, to form a watertight compartment inside the recess 106. The plate 106 is secured to the floor of the recess 105 by bolts 104, distributed around the periphery of the plate 106 at regular intervals and outside the o-ring groove. The bolts 104 engage within threaded sockets in the recess 105. Tensioning the bolts 104 holds the plate 106 in place, and compresses the O-ring 107, to seal the interior of the plate 6 against the ingress of fluids. The recess 105 extends radially into the outer surface of the connector in the direction of the arrow R in FIG. 4, perpendicular to the longitudinal axis X-X of the bore, and axially along the connector 101, parallel to the bore, and circumferentially around the outer surface of the recut length 102. The plate 106 follows the contours of the recess 105, and engages a sealing face surrounding the recess 6. The outer surface of the plate 106 is flush with the outer surface of the pin end of the riser pipe recut length outside the recess 105.

The recess is located in an optimal position for the sensor 10; 110 by FEA methods and taking into account the SCF as previously described for the earlier example such that the sensor 10; 110 experiences sufficient stress to accurately reflect the fatigue life of the connector 1; 101, without the sensor 10 being subjected to excessive fatigue so that it is prematurely damaged. In this way, the sensor 10; 110 is located in a position where the stresses are effectively tuned to the envisaged fatigue life of the connector 1; 101.

The interior of the recess 105 is adapted to contain beneath the plate 106 a fatigue damage sensor in the form of a CrackFirst™ fatigue sensor 110 as previously described. The fatigue damage sensor 110 is connected to the floor of the recess 105 extending parallel to the nominal outer diameter of the connector 101 by fixings such as bolts 103 set at axially spaced locations on the fatigue damage sensor as before. The location and geometry of the floor of the recess 105 is selected using FEA for a desired SCF as described in the previous example, and the fatigue damage sensor 110 is optionally subjected to a preload in an axial direction before being fixed to the floor of the recess 105. Optionally the floor of the recess 105 can be at the same axial spacing as the nominal outer diameter of the connector in the central section 101c. In the present example, the recut length 102 of the connector 101 having an expanded outer diameter and bearing the recess 105 transitions from the central section 101c of the connector 101 which has a reduced outer diameter as compared with the recut length 102 by a chamfered section of the connector 101.

In this example, ribbon cables connect the sensor 110 to an adapter in the form of an electronic circuit board 115 (also optionally having a function of a storage device and optionally a processor device) which is directly attached via cables to a communication port 120 extending through the plate 106 from the inner surface of the recess 105 to the outer surface of the plate 106. The outer surface of the port 120 is covered by a removable sealing cap, and the socket allows connection of power and/or signals conduits outside the outer surface of the plate 106 to the electronics package at the inner surface of the recess 105.

This example differs from the FIG. 1 arrangement in that a read-out of the data from the sensor 110 or the circuit board 115 can be obtained directly from the communication port 120, without removing the plate 106. Optionally the circuit board 115 can incorporate different processing elements, such as data storage, data processing, power and/or communications circuits. Thus the data points read by the sensor 110 can optionally be stored on the connector 101, so that changes in the growth of the crack can be mapped to particular times or time ranges or mapped to recorded events occurring within the life of the connector 101.

Once the riser is retrieved for inspection, the plate 106 is optionally removed and the fatigue damage can optionally be read out from the sensor 110 either visually, manually, or using a multi-meter to check for continuity across the sensor's crack tracks. This reading relates directly to a percentage of the fatigue life consumed by the riser in its previous deployment. The reading thereby obtained can be compared with the electronic data recovered from the port 120 as a cross check, but in some examples, this cross check of data by opening the plate 106 is not needed, and the data from the port 120 is sufficient, so the connector 101 can be interrogated for fatigue damage without opening the plate 106, thereby reducing downtime for redeployment.

Optionally, the data can be read from the fatigue damage sensor 110 at periodic intervals, for example days, weeks, months, or years, and can optionally be stored on the circuit board 115, or exported to a remote or adjacent data storage or processing device.

The circuit board 115 in this example is passive, as are all of the components within the recess 105, and has no power supply, processor, or storage functions. The circuit board in this example simply allows passive connection of the communication port 120 to the sensor 110 via the ribbon cables for performance of resistance measurements by an external powered device plugged into the port 120 to determine changes in the resistance in the sensor since the last reading of the resistance data.

Figure 3:
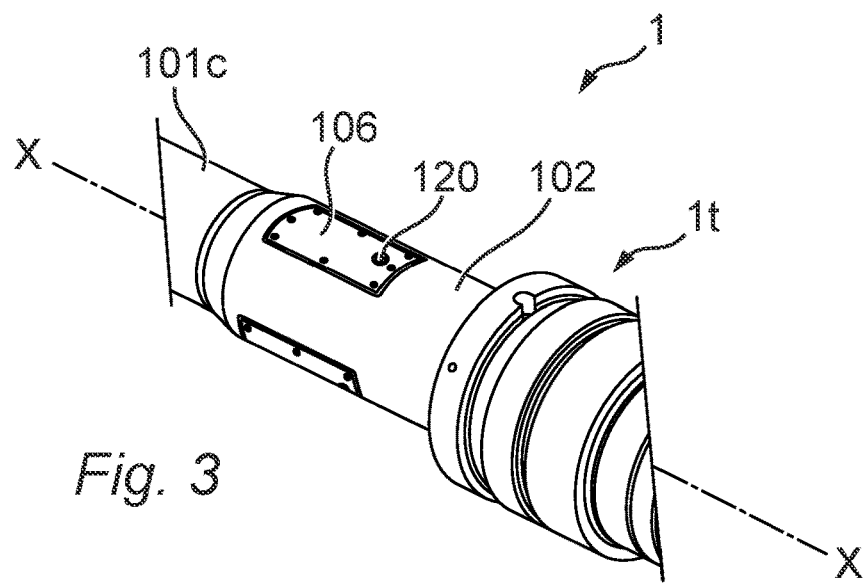
FIG. 3 shows a perspective view of the second example of FIG. 2.
Figure 4:
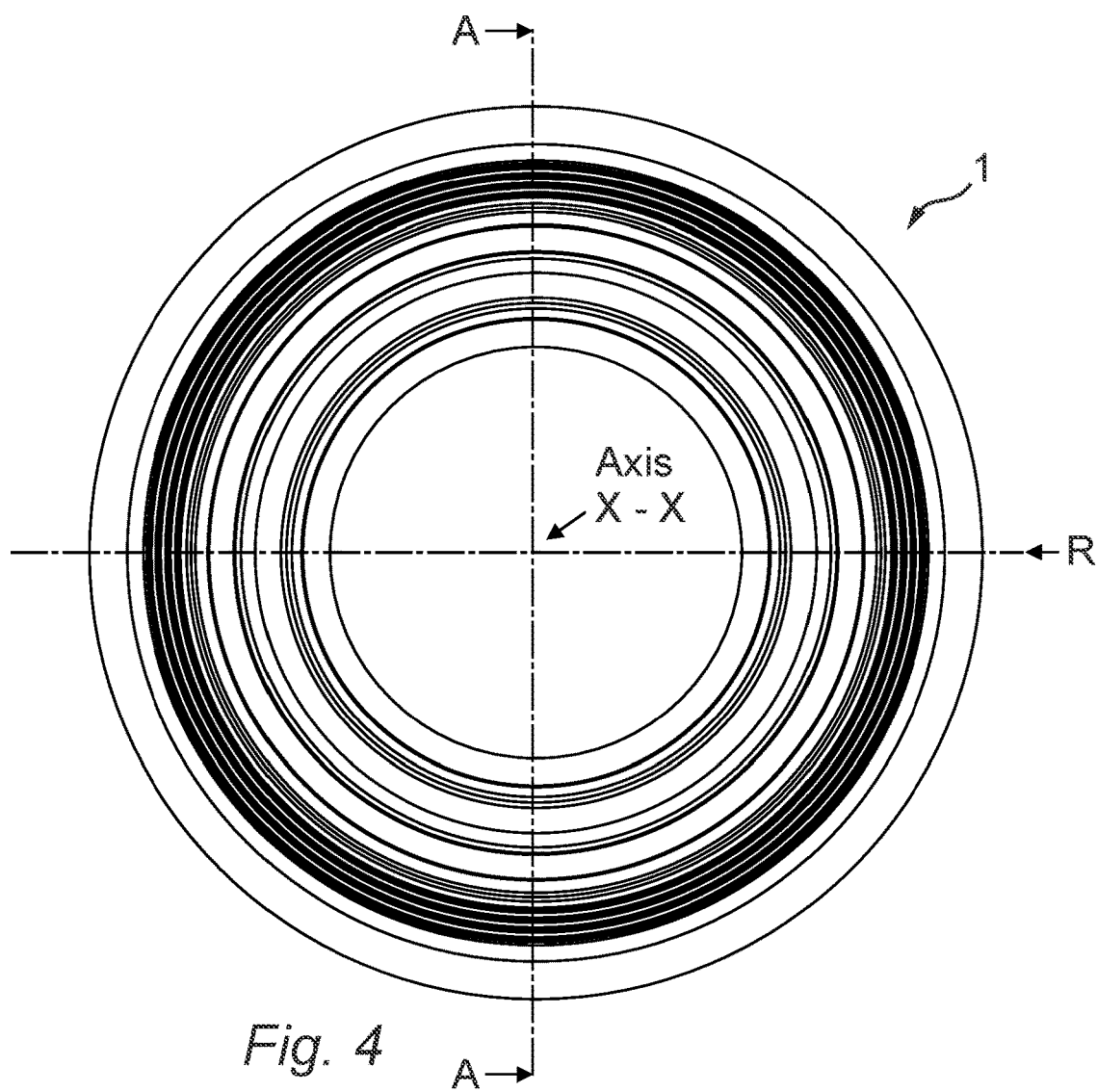
FIG. 4 shows an end view of a pin end of the connector of FIG. 2.
Figure 6:
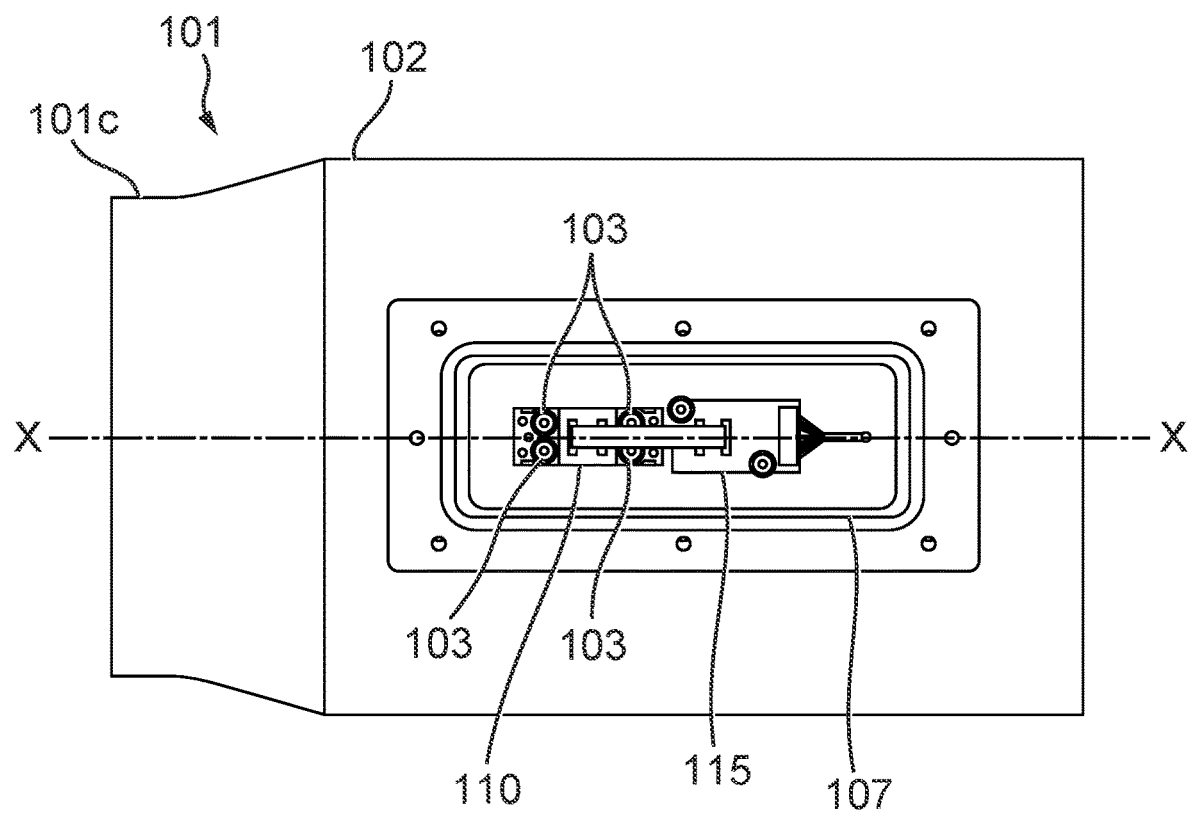
FIG. 6 shows a plan view of the recess shown in FIG. 5, with the cover plate removed for clarity, exposing the recess.
Figure 5:
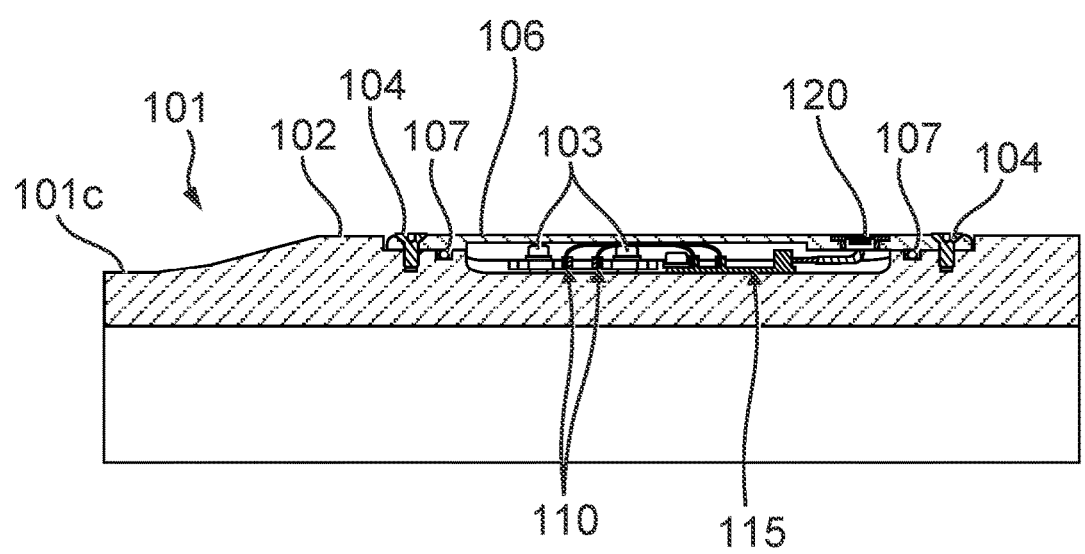
FIG. 5 shows a sectional view through line A-A of FIG. 2, showing the internal detail of a recess in the connector of FIG. 2.

The connector 101 has a plurality of sensors 110, which can be located in respective recesses 105 at the same axial position on the connector 101, but spaced apart from one another circumferentially around the outer surface of the body of the connector 101 as shown best in FIG. 3. The recesses 105 at the same axial position are optionally spaced circumferentially at regular intervals around the outer circumference of the connector 101.

The invention claimed is:

1. A marine riser component comprising a central longitudinal axis and an integrated fatigue damage sensor, wherein the fatigue damage sensor is mounted in a closed recess formed on an outer surface of the marine riser component, adapted to be damaged by stresses and strains applied to the marine riser component, and adapted to record said damage.

2. A marine riser component as claimed in claim 1, wherein the recess is sealed.

3. A marine riser component as claimed in claim 1, further comprising:
a groove;
a seal retained within said groove and surrounding said recess; and
a cover adapted to be held in position over the recess by a plurality of fasteners distributed around the periphery of said cover and adapted to engage portions of the component located outside the area surrounded by the groove.

4. A marine riser component as claimed in claim 1, wherein the recess is formed on an end terminal of a marine riser pipe having an expanded outer diameter larger than a central section of the marine riser pipe.

5. A marine riser component as claimed in claim 1, wherein the fatigue damage sensor is fixed to an inner surface of the recess at locations on the fatigue damage sensor that are axially spaced apart relative to the central longitudinal axis of the marine riser component.

6. A marine riser component as claimed in claim 1, wherein the recess comprises a floor extending substantially parallel to the central longitudinal axis of the marine riser component, and the fatigue damage sensor is fixed to the floor of the recess.

7. A marine riser component comprising a central longitudinal axis and a fatigue damage sensor integrated into the marine riser component in a location on the component that transmits fatigue loads to the sensor at a known stress concentration factor,
wherein the location is chosen based on the known stress concentration factor required to apply sufficient fatigue loads to the sensor to damage the sensor during a known period of normal operation of the marine riser component, and wherein the fatigue loads applied to the sensor during normal operation are limited in accordance with the stress concentration factor to loads that cause damage to the sensor over the known period of normal operation without destruction of the sensor as a result of the fatigue loads during the normal period of operation,
wherein the sensor is adapted to be damaged by stresses and strains applied to the marine riser component, and
wherein the sensor is adapted to record said damage.

8. A method of assessing fatigue damage in a marine riser component, the method comprising:
integrating a fatigue damage sensor into a body of the marine riser component comprising a central longitudinal axis; and
recording on the sensor fatigue damage to the sensor caused by stresses and strains applied to the marine riser component, and
mounting the fatigue damage sensor in a closed recess on the outer surface of the body.

9. A method as claimed in claim 8, further comprising sealing the recess.

10. A method as claimed in claim 8, wherein the recess comprises a floor extending substantially parallel to the central longitudinal axis of the body, and the method further comprising connecting the fatigue damage sensor to the floor of the recess.

11. A method as claimed in claim 8, further comprising fixing the fatigue damage sensor to the body at locations on the fatigue damage sensor that are axially spaced apart relative to the central longitudinal axis of the body.

12. A method as claimed in claim 8, further comprising integrating the sensor into the body in a location on the body that transmits fatigue loads to the sensor at a known stress concentration factor.

13. A method as claimed in claim 12, wherein the location is chosen based on the known stress concentration factor required to apply sufficient fatigue loads to the sensor to damage the sensor during a known period of normal operation of the marine riser component, and wherein the fatigue loads applied to the sensor during normal operation are limited in accordance with the stress concentration factor to loads that cause damage to the sensor over the known period of normal operation without destruction of the sensor as a result of the fatigue loads during the normal period of operation.

14. A method of assessing fatigue damage in a marine riser component, the method comprising:
integrating a fatigue damage sensor into a body of the marine riser component in a location on the body that transmits fatigue loads to the sensor at a known stress concentration factor, wherein the location is chosen based on the known stress concentration factor required to apply sufficient fatigue loads to the sensor to damage the sensor during a known period of normal operation of the marine riser component, and wherein the fatigue loads applied to the sensor during normal operation are limited in accordance with the stress concentration factor to loads that cause damage to the sensor over the known period of normal operation without destruction of the sensor as a result of the fatigue loads during the normal period of operation;
recording on the sensor fatigue damage to the sensor caused by stresses and strains applied to the body; and
collecting said fatigue damage from the sensor.

15. A marine riser component comprising a central longitudinal axis and an integrated fatigue damage sensor,
wherein the sensor is adapted to be damaged by stresses and strains applied to the marine riser component,
wherein the sensor is adapted to record said damage, and
wherein the sensor is mounted on a marine riser pipe having a first outer diameter and a second outer diameter larger than the first outer diameter, and the integrated fatigue sensor is located on a portion of the marine riser pipe having the second outer diameter.

16. A method of assessing fatigue damage in a marine riser component, the method comprising:
integrating a fatigue damage sensor into a body of the marine riser component comprising a central longitudinal axis;
recording on the sensor fatigue damage to the sensor caused by stresses and strains applied to the marine riser component,
wherein the sensor is mounted on a marine riser pipe having a first outer diameter and a second outer diameter larger than the first outer diameter, and the integrated fatigue sensor is located on a portion of the marine riser pipe having the second outer diameter.

* * * * *